(12) United States Patent
Choi

(10) Patent No.: US 9,316,264 B2
(45) Date of Patent: Apr. 19, 2016

(54) PROPELLER SHAFT

(71) Applicant: Hyundai Motor Company, Seoul (KR)

(72) Inventor: Won Jun Choi, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/300,970

(22) Filed: Jun. 10, 2014

(65) Prior Publication Data

US 2015/0119154 A1 Apr. 30, 2015

(30) Foreign Application Priority Data

Oct. 24, 2013 (KR) .................. 10-2013-0127441

(51) Int. Cl.
*F16D 3/02* (2006.01)
*F16D 3/06* (2006.01)
*F16C 3/03* (2006.01)
*F16D 1/10* (2006.01)
*F16F 15/00* (2006.01)

(52) U.S. Cl.
CPC ... *F16D 3/06* (2013.01); *F16C 3/03* (2013.01); *F16D 1/10* (2013.01); *F16D 2001/103* (2013.01); *F16D 2300/22* (2013.01); *F16F 15/00* (2013.01); *Y10T 464/50* (2015.01)

(58) Field of Classification Search
CPC ....... F16C 3/03; F16D 1/10; F16D 2001/103; F16D 3/06; F16D 2300/22; F16F 15/00; Y10T 464/50
USPC .......... 464/127, 180, 182, 183; 188/379, 380; 280/777
See application file for complete search history.

(56) References Cited

U.S. PATENT DOCUMENTS

| 3,293,884 | A | * | 12/1966 | Grob |
| 5,228,720 | A | * | 7/1993 | Sato et al. ..................... 280/777 |
| 6,193,612 | B1 | | 2/2001 | Craig et al. |
| 7,025,686 | B1 | * | 4/2006 | Aiken ....................... 464/183 X |
| 7,163,462 | B2 | * | 1/2007 | Okude et al. ................... 464/182 |
| 2003/0040370 | A1 | * | 2/2003 | Gartner et al. ................ 464/180 |

FOREIGN PATENT DOCUMENTS

| JP | 11-303846 A | 11/1999 |
| JP | 2000-283138 A | 10/2000 |
| JP | 2003-262252 A | 9/2003 |
| JP | 2004-308700 A | 11/2004 |
| JP | 2005-315323 A | 11/2005 |
| KR | 1999-0026789 U | 7/1999 |
| KR | 10-2009-0045732 A | 5/2009 |
| KR | 10-2010-0060378 A | 6/2010 |

* cited by examiner

*Primary Examiner* — Gregory Binda
(74) *Attorney, Agent, or Firm* — Morgan, Lewis & Bockius LLP

(57) ABSTRACT

A propeller shaft for a vehicle includes a shaft having locking protrusions on an outer circumference, a tube having locking grooves on an inner circumference into which the shaft is inserted, the locking grooves engaging with the locking protrusions to form the spline coupling, a dynamic damper inside the tube to correspond to an end of the shaft and absorbing vibrations transmitted from a driving system, and a rubber stopper interposed between an outer circumference of the dynamic damper and the inner circumference of the tube to support the dynamic damper and correspond to the end of the shaft to limit sliding of the tube at normal times. The rubber stopper is broken by a pushing operation of the tube when an impact load greater than a collapse load of the rubber stopper acts on the rubber stopper, thereby permitting the sliding of the tube.

10 Claims, 7 Drawing Sheets

PROPELLER SHAFT

CROSS-REFERENCE(S) TO RELATED APPLICATION

The present application claims priority of Korean Patent Application Number 10-2013-0127441 filed on Oct. 24, 2013, the entire contents of which application are incorporated herein for all purposes by this reference.

BACKGROUND OF INVENTION

1. Field of Invention

The present invention relates, in general, to propeller shafts for vehicles, and, more particularly, to a propeller shaft for a vehicle, which is intended to sufficiently absorb a change in axial length owing to a low collapse load in the event of a vehicle crash and thereby to sufficiently absorb impact energy, thus being capable of reducing injury to passengers to the maximum.

2. Description of Related Art

Generally, as shown in FIG. 1, a propeller shaft 10 installed at a rear-wheel-drive vehicle is a power transmission device that smoothly transmits a driving force of a power train including an engine 1 and a transmission 2 to a rear axle 3. The propeller shaft 10 should have a sufficient torsional strength to allow for a smooth torque transfer, and should have a sufficient bending rigidity because the propeller shaft 10 is long in an axial direction.

Further, recently, safety regulations on crashes are considered as an important performance factor. Hence, in addition to the above-mentioned basic characteristics, there has been employed technology that reduces injury to a passenger by absorbing shocks through a change in axial length in the event of a vehicle crash.

However, the conventional propeller shaft 10 is problematic in that its change in axial length is not sufficient due to a high collapse load in the event of a vehicle crash, so that the propeller shaft 10 cannot sufficiently absorb shocks and thereby increases injury to a passenger.

That is, as shown in FIG. 2, the conventional propeller shaft 10 includes a front coupling 11 used to couple the propeller shaft 10 to the transmission 2, a front yoke 12 coupled to the front coupling 11, a front tube 13 coupled to the front yoke 12, a rear tube 15 connected to the front tube 13 via a universal joint 14, a rear yoke 16 coupled to the rear tube 15, and a rear coupling 17 used to couple the propeller shaft 10 to the rear axle 3.

Here, the front tube 13 is provided with a diameter change portion 13a that is made by a swaging process. The front tube 13 is divided into a smaller diameter portion 13b extending towards the front yoke 12 and a larger diameter portion 13c extending towards the universal joint 14, with respect to the diameter change portion 13a.

The smaller diameter portion 13b is smaller in diameter than the larger diameter portion 13c, and the smaller diameter portion 13b and the larger diameter portion 13c are connected to each other via the diameter change portion 13a.

Thus, if the impact energy generated in the event of a vehicle crash is transmitted through the power train to the propeller shaft 10, as shown in FIG. 3, the diameter change portion 13a is deformed while the smaller diameter portion 13b is inserted into the larger diameter portion 13c. Such a movement of the smaller diameter portion 13b allows the propeller shaft 10 to absorb the impact energy.

However, the conventional propeller shaft 10 is problematic in that a difference in diameter between the smaller diameter portion 13b and the larger diameter portion 13c is not large, so that a rearward moving amount of the smaller diameter portion 13b is small, and thus a change in axial length is not sufficient due to a high collapse load. Consequently, it is impossible to sufficiently absorb impact energy. In particular, injury to a passenger is increased due to the high deceleration of the vehicle.

Therefore, in order to increase a difference in diameter between the smaller diameter portion 13b and the larger diameter portion 13c, a method of either reducing the diameter of the smaller diameter portion 13b or increasing the diameter of the larger diameter portion 13c has been proposed. However, such a change in diameter changes a basic strength or raises a new problem due to weight and a package with peripheral components.

Further, in order to increase the rearward moving amount of the smaller diameter portion 13b, a method of changing the physical properties of a material and lowering the collapse load has been proposed. However, such a method is not desirable because it causes a reduction in basic strength of the propeller shaft 10.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a propeller shaft for a vehicle, in which an axial length is sufficiently changed in the event of a vehicle crash to sufficiently absorb impact energy resulting from a crash and thereby decrease shock transmitted to a vehicle body, thus reducing injury to a passenger to the maximum.

Various aspects of the present invention provide for a propeller shaft that may include: a shaft having on an outer circumference of an end thereof a plurality of locking protrusions for a spline coupling; a tube having, on an inner circumference thereof into which the shaft is inserted, a plurality of locking grooves, the locking grooves engaging with the locking protrusions to form the spline coupling; a dynamic damper provided inside the tube, disposed to correspond to the end of the shaft, and absorbing vibrations transmitted from a driving system; and a rubber stopper interposed between an outer circumference of the dynamic damper and the inner circumference of the tube to support the dynamic damper, and provided to correspond to the end of the shaft to limit sliding of the tube at normal times, the rubber stopper being broken by a pushing operation of the tube when an impact load greater than a collapse load of the rubber stopper acts on the rubber stopper, thus permitting the sliding of the tube.

The locking protrusions of the shaft and the locking grooves of the tube may be formed in a shape of corresponding involute gears. The tube may include a rod-shaped axial body, and a hub connected to the axial body and having on an inner circumference thereof the plurality of locking grooves that engage with the locking protrusions.

The dynamic damper may include a mass portion provided inside the tube and having a predetermined weight, and a plurality of rubber portions coupled to surround the mass portion and protruding from the mass portion towards the inner circumference of the tube. The rubber portions of the dynamic damper may extend towards the inner circumference of the tube, and may be formed to be spaced apart from the inner circumference of the tube by a predetermined interval.

The rubber stopper may include a plurality of connecting bridges that are repeatedly formed along an inner circumferential direction of the tube and spaced apart from each other by a predetermined interval, the connecting bridges connecting the outer circumference of the dynamic damper to the inner circumference of the tube. The rubber stopper may further include a base portion that has a predetermined area and is coupled to the inner circumference of the tube, the connecting bridges integrated with the base portion and coupled to the outer circumference of the dynamic damper.

As is apparent from the above description, the propeller shaft for the vehicle is advantageous in that the shaft and the tube slide axially to sufficiently change the axial length in the event of the vehicle crash, thus being capable of sufficiently absorbing impact energy resulting from the crash. Thereby, it is possible to decrease shocks transmitted to the vehicle body and reduce injury to a passenger to the maximum.

Moreover, the propeller shaft for the vehicle is advantageous in that vibrations transmitted from the engine driving system are reduced by the dynamic damper, thus preventing the propeller shaft from being damaged due to the vibrations and enhancing durability.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
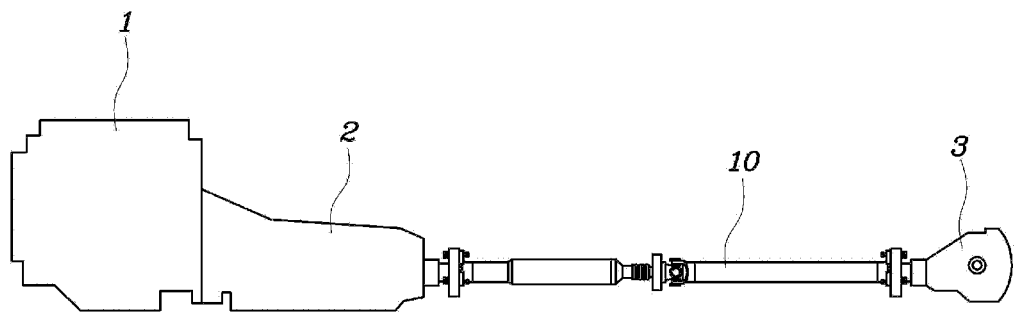
FIG. 1 is a view showing a propeller shaft connecting a power train with a rear axle.
Figure 2:
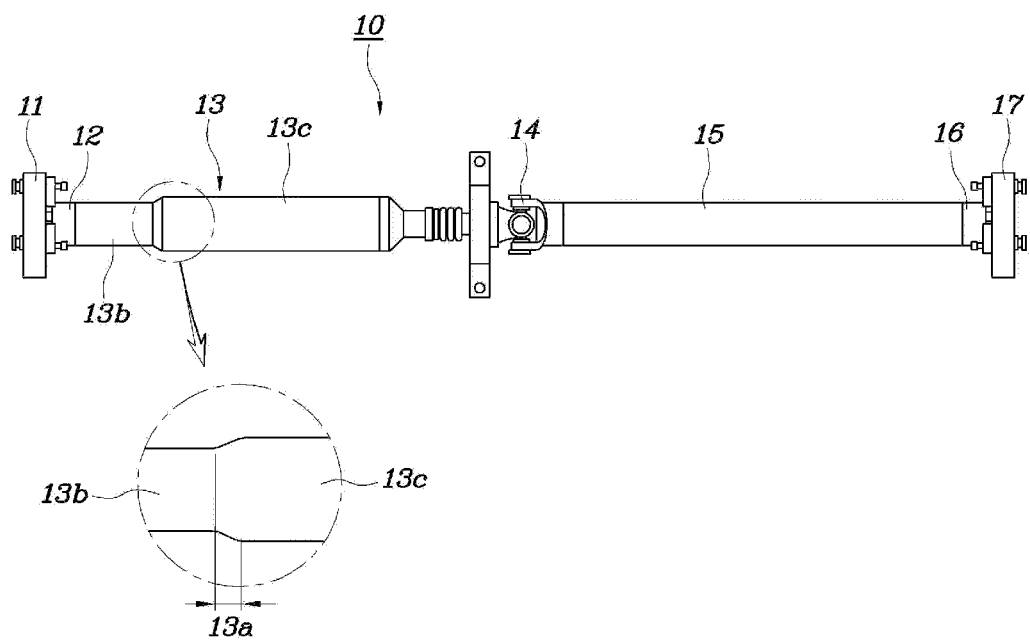
FIG. 2 is a view illustrating a conventional propeller shaft.
Figure 3:
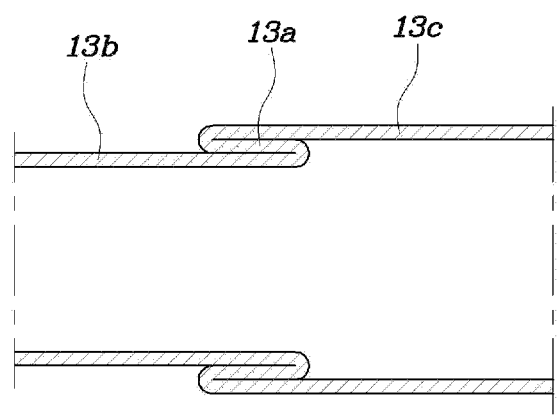
FIG. 3 is a sectional view showing a diameter change portion of a front tube deformed by a vehicle crash, in the conventional propeller shaft shown in FIG. 2.
Figure 4:
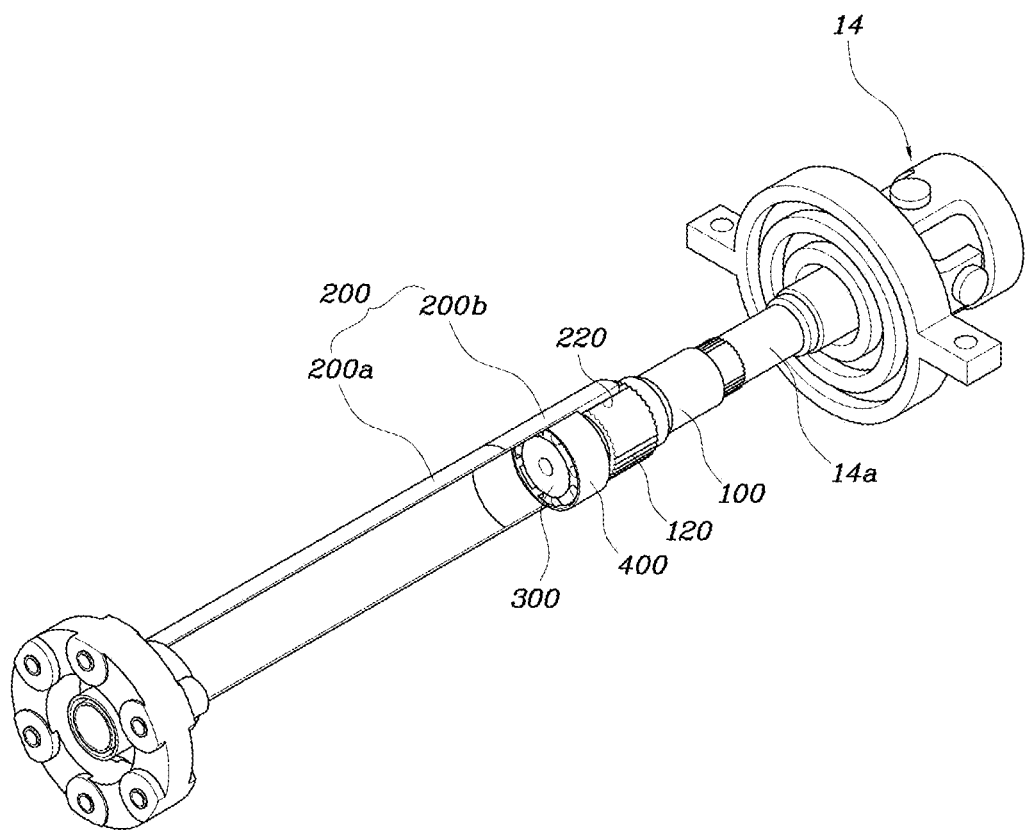
FIG. 4 is a view showing an exemplary propeller shaft for a vehicle according to the present invention.

A propeller shaft for a vehicle according to the present invention includes a front coupling 11 used to couple the propeller shaft with a transmission 2, a front yoke 12 coupled to the front coupling 11, a shaft 100 welded or fixed at one end thereof to the front yoke 12, a tube 200 coupled to the shaft 100 to form a spline coupling B, a rear tube 15 connected via a universal joint 14, a rear yoke 16 coupled to the rear tube 15, and a rear coupling 17 used to couple the propeller shaft with a rear axle 3. The transmission 2, the rear axle 3, the front coupling 11, the front yoke 12, the universal joint 14, the rear tube 15, the rear yoke 16, and the rear coupling 17 are the same as or similar to those illustrated in FIGS. 1-2.

The propeller shaft according to the present invention will be described in detail with reference to FIGS. 4 to 8. The propeller shaft of this invention includes a shaft 100, a tube 200, a dynamic damper 300 and a rubber stopper 400. The shaft 100 has on an outer circumference of an end thereof a plurality of locking protrusions 120 for the spline coupling. The tube 200 has, on an inner circumference thereof into which the shaft 100 is inserted, a plurality of locking grooves 220 that engage with the locking protrusions 120 to make the spline coupling. The dynamic damper 300 is provided inside the tube 200, is disposed to correspond to the end of the shaft 100, and absorbs vibrations transmitted from a driving system. The rubber stopper 400 is interposed between an outer circumference of the dynamic damper 300 and the inner circumference of the tube 200 to support the dynamic damper 300, and is provided to correspond to the end of the shaft 100 to limit sliding of the tube 200 at normal times. The rubber stopper 400 is broken by a pushing operation of the tube 200 when a crash load acts on the rubber stopper 400, thus permitting the sliding of the tube 200.

Figure 5:
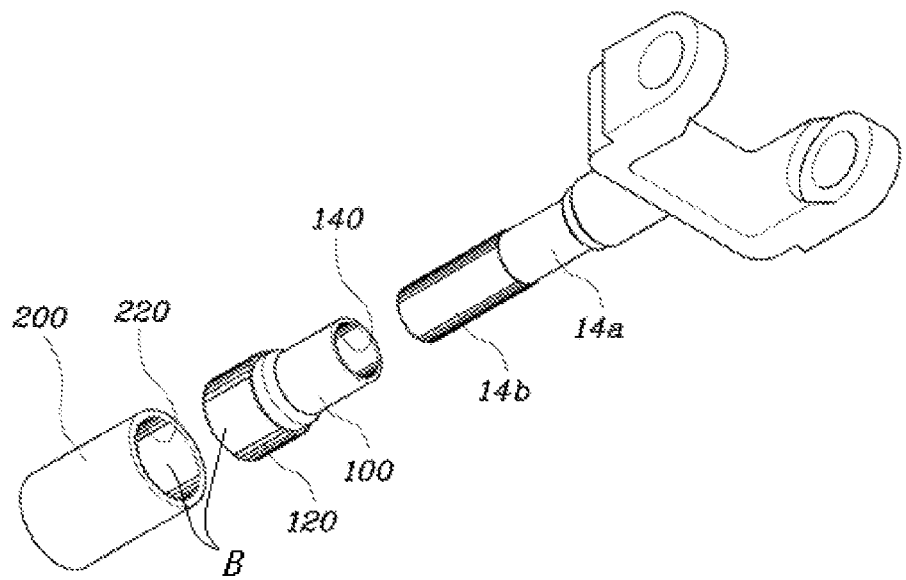
FIG. 5 is a view showing the configuration of the propeller shaft shown in FIG. 4.

Here, as shown in FIG. 5, the shaft 100 further includes a spline portion 140 that is formed on an inner circumference of the other end opposite to the end coupled to the tube 200 and is used to form the spline coupling. A spline corresponding portion 14b may be provided on a yoke shaft 14a of the universal joint 14 to correspond to a spline structure that is formed on the other end of the shaft 100. As such, the spline coupling of the shaft 100 with the yoke shaft 14a can transmit a rotating force and can simultaneously absorb a change in axial length of the propeller shaft, which occurs in a normal driving operation.

According to the present invention, the plurality of locking protrusions 120 is formed on the outer circumference of the shaft 100, and the plurality of locking grooves 220 is formed on the inner circumference of the tube 200. The locking protrusions 120 engage with the locking grooves 220, so that the shaft 100 and the tube 200 form the spline coupling. That is, the shaft 100 and the tube 200 form the spline coupling by the engagement between the locking protrusions 120 and the locking grooves 220. Thereby, as the rotating force is transmitted from the driving system, the shaft 100 and the tube 200 are rotated at the same time. Therefore, although the shaft 100 and the tube 200 of the present invention are separated from each other, they are simultaneously rotated via the spline coupling, thus enabling the rotating force to be transmitted from the driving system such as the engine without a loss.

In this context, the locking protrusions 120 of the shaft 100 and the locking grooves 220 of the tube 200 may be formed in a shape of corresponding involute gears.

Since the shaft 100 and the tube 200 of the present invention engage with each other via the locking protrusions 120 and the locking grooves 220 to smoothly transmit the rotating force, they are preferably formed in the shape of the involute gears. Since the involute gear generally has teeth of high strength and good compatibility and the engagement of the involute gear is rarely affected in spite of an error, the involute gear is advantageous for transmitting the rotating force. That is, the shaft 100 and the tube 200 are formed in the shape of the involute gear to ensure the smooth transmission of the rotating force as well as sufficient torsional strength, thus satisfying a condition that is advantageous for the shaft 100 and the tube 200 to transmit the rotating force.

The locking protrusions 120 of the shaft 100 and the locking grooves 220 of the tube 200 are most preferably formed in the shape of the involute gear, but may have various shapes, such as a polygonal shape or a toothed shape.

On one hand, the tube 200 may include a rod-shaped axial body 200a, and a hub 200b that is connected to the axial body 200a and has on an inner circumference thereof the plurality of locking grooves 220 engaging with the locking protrusions 120.

In the present invention, the locking grooves 220 engaging with the locking protrusions 120 may be formed on the axial body 200a of the tube 200 without the hub 200b, in order to couple the tube 200 to the shaft 100. However, in terms of the material and structural characteristics of the tube 200, a method of forming the locking grooves 220 corresponding to the locking protrusions 120 on the inner circumference has limitations, incurs high manufacturing cost, and is difficult to precisely process. However, when the tube 200 is configured to have the axial body 200a and the hub 200b, it facilitates the installation of the dynamic damper 300 and the rubber stopper 400 that will be described below in detail.

Here, the axial body 200a is coupled to the hub 200b such as by friction welding. Since each of the axial body 200a and the hub 200b according to the present invention is formed in the shape of a circular rod, it is efficient to utilize friction welding. This realizes a reduction in power consumption and an efficient process.

Further, the dynamic damper 300 includes a mass portion 320 that is provided inside the tube 200 and has a predetermined weight, and a plurality of rubber portions 340 that are coupled to surround the mass portion 320 and protrude from the mass portion 320 towards the inner circumference of the tube 200.

Here, the rubber portions 340 of the dynamic damper 300 extend towards the inner circumference of the tube 200, and are formed to be spaced apart from the inner circumference of the tube 200 by a predetermined interval G.

According to the present invention, the dynamic damper 300 is provided in the tube 200 to absorb vibrations transmitted from the engine and the transmission. To this end, the dynamic damper 300 includes the mass portion 320 and the rubber portions 340. The mass portion 320 is a weight body having a predetermined weight, and its weight may be set depending on a specific resonant frequency transmitted from the propeller shaft.

Further, the rubber portions 340 are formed to surround the mass portion 320 and are integrally coupled with the mass portion 320. The rubber portions 340 are coupled to the rubber stopper 400 that will be described below in detail, thus attenuating vibrations transmitted from the propeller shaft in the tube 200 in cooperation with the mass portion 320. The plurality of rubber portions 340 protrudes from the mass portion 320. In this regard, the number, area, thickness, and material of the rubber portions 340 may be set depending on a specific resonant frequency transmitted from the propeller shaft.

Here, the rubber portions 340 of the dynamic damper 300 extend towards the inner circumference of the tube 200 in such a way as to be spaced apart from the inner circumference of the tube 200 by a predetermined interval G. If the rubber portions 340 of the dynamic damper 300 are too near to the inner circumference of the tube 200, the rubber portions 340 come into contact with the tube 200 by the vibrations transmitted from the propeller shaft, so that the vibrations cannot be smoothly attenuated. In contrast, if the rubber portions 340 are too far from the tube 200, the mass portion 320 excessively vibrates so as to attenuate vibrations, and thus the rubber portions 340 may be undesirably broken.

Therefore, in consideration of frequency characteristics transmitted through the propeller shaft, a spacing distance between the rubber portions 340 of the dynamic damper 300 and the inner circumference of the tube 200 is appropriately set, thus suppressing the excessive vibration of the mass portion 320 and smoothly attenuating vibrations.

Further, the rubber stopper 400 includes a plurality of connecting bridges 420 that are repeatedly formed along the inner circumference of the tube 200, or repeatedly formed along an inner circumferential direction of the tube 200, in such a way as to be spaced apart from each other by a predetermined interval, the connecting bridges 420 connecting an outer circumference of the dynamic damper 300 to the inner circumference of the tube 200. Such a rubber stopper 400 connects the dynamic damper 300 to the inner circumference of the tube 200, and limits the forward-backward sliding of the tube 200.

To be more specific, the rubber stopper 400 includes the plurality of connecting bridges 420 that are repeatedly formed along the inner circumference of the tube 200, or repeatedly formed along an inner circumferential direction of the tube 200, in such a way as to be spaced apart from each other by a predetermined interval. The connecting bridges 420 are coupled to the outer circumference of the dynamic damper 300, thus supporting the dynamic damper 300.

The rubber stopper 400 limits the axial sliding of the tube 200 at normal times, whereas it is broken to allow the sliding of the tube 200 in the event of a vehicle crash. At normal times, in the state where the connecting bridges 420 are coupled to the tube 200 and the dynamic damper 300, the rubber stopper 400 is supported by the end of the shaft 100, thus limiting axial sliding. In such a state, if the impact load acts on the rubber stopper 400 in the event of the vehicle crash, the tube 200 is axially pushed, and the connecting bridges 420 coupled to the tube 200 are supported by the shaft 100 and are broken, thus allowing the sliding of the tube 200.

A load limiting the sliding of the tube 200 adjusts the coupled places, thickness, coupled area of the connecting bridges 420 constituting the rubber stopper 400, thus being capable of adjusting the collapse load in the event of the vehicle collapse according to a vehicle specification.

Preferably, the rubber stopper 400 is provided with a base portion 440 that has a predetermined area and is coupled to the inner circumference of the tube 200. The connecting bridges 420 integrated with the base portion 440 are coupled to the outer circumference of the dynamic damper 300.

As such, the base portion 440 is coupled to the inner circumference of the tube 200, and the connecting bridges 420 are integrally coupled to the base portion 440, so that the rubber stopper 400 is firmly secured to the tube 200 and thereby the connecting bridges 420 can respond to a high load transmitted in the event of the vehicle crash.

The mass portion 320 and the rubber portions 340 of the dynamic damper 300, and the base portion 440 and the connecting bridges 420 of the rubber stopper 400 may be integrally coupled or monolithically formed into a single structure.

Figure 6:
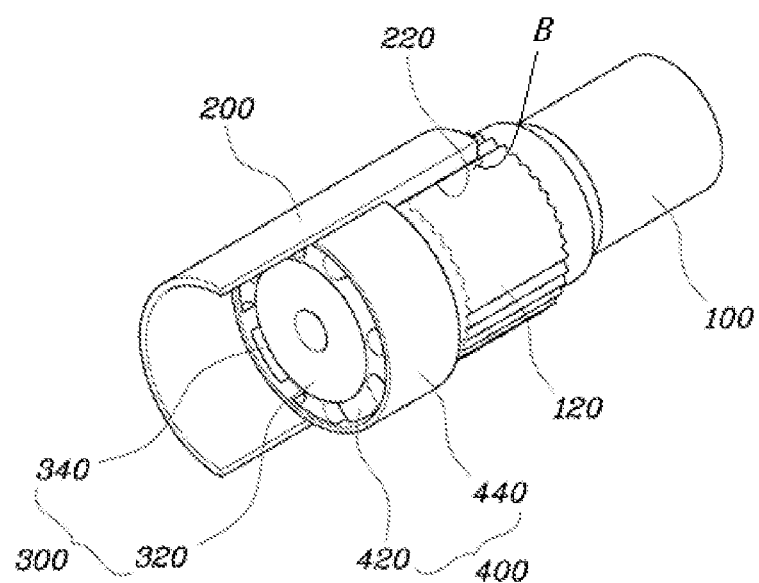
FIGS. 6 and 7 are views showing the operation of the propeller shaft shown in FIG. 4.
Figure 7:
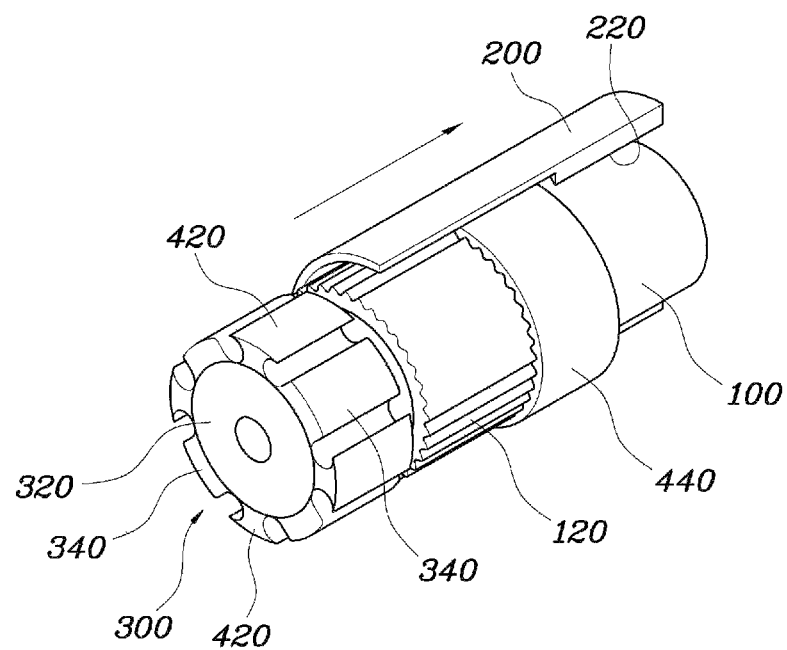
Figure 8:
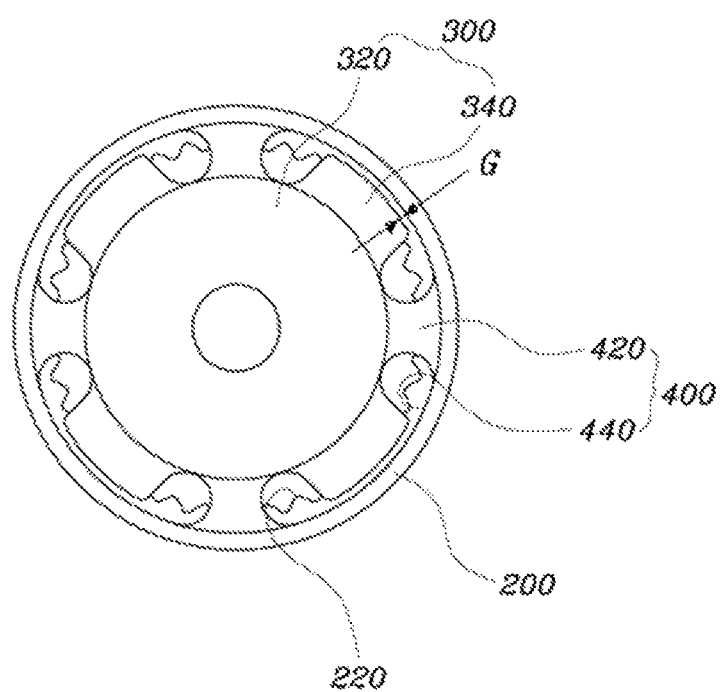
FIG. 8 is a view showing an exemplary dynamic damper and an exemplary rubber stopper of the propeller shaft shown in FIG. 4.

An operation of the propeller shaft according to the present invention configured as described above is as follows. FIGS. 6 and 7 are views showing a compression amount of the propeller shaft according to the present invention, before and after the crash. As shown in FIG. 6, before the crash, in the state where the shaft 100 and the tube 200 are coupled by the spline coupling using the locking protrusions 120 and the locking grooves 220, the rubber stopper 400 is supported by the shaft 100, thus limiting the axial movement of the tube 200. That is, in a normal driving state before the crash, the tube 200 and the shaft 100 transmit a rotating force from the engine without a loss via the spline coupling, and the dynamic damper 300 absorbs vibrations transmitted from the driving system such as the engine and the transmission.

As shown in FIG. 7, in the event of a head-on crash, impact energy is transmitted from the driving system. If a load transmitted to the tube 200 is larger than the collapse load of the rubber stopper 400, the rubber stopper 400 is axially broken, thus permitting the sliding of the tube 200. As such, the tube 200 is axially moved along the shaft 100 by the crash load, thus sufficiently changing the axial length of the propeller shaft and thereby sufficiently absorbing shock resulting from a crash, using the movement of the tube 200.

Such a propeller shaft can control an axial strain of the propeller shaft by adjusting the length of the shaft 100 along which the tube 200 is moved, thus being flexibly applied to various models of vehicles.

That is, according to the present invention, the shaft 100 and the tube 200 are simultaneously rotated via the spline coupling, thus being capable of transmitting the rotating force generated from the engine without a loss. Meanwhile, in the event of a vehicle crash, the rubber stopper 400 limiting the movement of the shaft 100 is broken, so that the tube 200 is axially moved along the shaft 100. Such a characteristic is advantageous to absorb shocks.

For convenience in explanation and accurate definition in the appended claims, the terms "inner" or "outer", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A propeller shaft, comprising:
   a shaft having, on an outer circumference of an end thereof, a plurality of locking protrusions for a spline coupling;
   a tube having, on an inner circumference thereof into which the shaft is inserted, a plurality of locking grooves, the locking grooves engaging with the locking protrusions to form the spline coupling;
   a dynamic damper provided inside the tube, disposed to correspond to the end of the shaft, and absorbing vibrations transmitted from a driving system; and
   a rubber stopper interposed between an outer circumference of the dynamic damper and the inner circumference of the tube to support the dynamic damper, and provided to correspond to the end of the shaft to limit sliding of the tube at normal times, the rubber stopper being broken by a pushing operation of the tube when an impact load greater than a collapse load of the rubber stopper acts on the rubber stopper, thereby permitting the sliding of the tube,
   wherein the rubber stopper comprises a plurality of connecting bridges that are repeatedly formed along an inner circumferential direction of the tube and spaced apart from each other by a predetermined interval, the connecting bridges connecting the outer circumference of the dynamic damper to the inner circumference of the tube.

2. The propeller shaft as set forth in claim 1, wherein the locking protrusions of the shaft and the locking grooves of the tube are formed in a shape of corresponding involute gears.

3. The propeller shaft as set forth in claim 1, wherein the tube comprises:
   a rod-shaped axial body; and
   a hub connected to the axial body, and having on an inner circumference thereof the plurality of locking grooves that engage with the locking protrusions.

4. The propeller shaft as set forth in claim 1, wherein the dynamic damper comprises:
   a mass portion provided inside the tube, and having a predetermined weight; and
   a plurality of rubber portions coupled to surround the mass portion, and protruding from the mass portion towards the inner circumference of the tube.

5. The propeller shaft as set forth in claim 4, wherein the rubber portions of the dynamic damper extend towards the inner circumference of the tube, and are formed to be spaced apart from the inner circumference of the tube by a predetermined interval.

6. The propeller shaft as set forth in claim 1, wherein the rubber stopper further comprises a base portion that has a predetermined area and is coupled to the inner circumference of the tube, the connecting bridges integrated with the base portion and coupled to the outer circumference of the dynamic damper.

7. A propeller shaft, comprising:
   a shaft having, on an outer circumference of an end thereof, a plurality of locking protrusions for a spline coupling;
   a tube having, on an inner circumference thereof into which the shaft is inserted, a plurality of locking grooves, the locking grooves engaging with the locking protrusions to form the spline coupling;
   a dynamic damper provided inside the tube, disposed to correspond to the end of the shaft, and absorbing vibrations transmitted from a driving system; and
   a rubber stopper interposed between an outer circumference of the dynamic damper and the inner circumference of the tube to support the dynamic damper, and provided to correspond to the end of the shaft to limit sliding of the tube at normal times, the rubber stopper being broken by a pushing operation of the tube when an impact load greater than a collapse load of the rubber stopper acts on the rubber stopper, thereby permitting the sliding of the tube,
   wherein the dynamic damper comprises:
   a mass portion provided inside the tube, and having a predetermined weight; and
   a plurality of rubber portions coupled to surround the mass portion, and protruding from the mass portion towards the inner circumference of the tube.

8. The propeller shaft as set forth in claim 7, wherein the locking protrusions of the shaft and the locking grooves of the tube are formed in a shape of corresponding involute gears.

9. The propeller shaft as set forth in claim 7, wherein the tube comprises:
   a rod-shaped axial body; and
   a hub connected to the axial body, and having on an inner circumference thereof the plurality of locking grooves that engage with the locking protrusions.

10. The propeller shaft as set forth in claim 7, wherein the rubber portions of the dynamic damper extend towards the inner circumference of the tube, and are formed to be spaced apart from the inner circumference of the tube by a predetermined interval.

\* \* \* \* \*